United States Patent [19]

Nolf

[11] 4,350,842
[45] Sep. 21, 1982

[54] CABLE SLEEVE OUTLET FOR SPLICE CASE

[75] Inventor: Jean-Marie E. Nolf, Hammemille, Belgium

[73] Assignee: N.V. Raychem S.A., Belgium

[21] Appl. No.: 175,693

[22] Filed: Aug. 6, 1980

[30] Foreign Application Priority Data

Aug. 7, 1979 [GB] United Kingdom ............... 7927528

[51] Int. Cl.³ ..................... H01R 4/00; H02G 13/06
[52] U.S. Cl. ........................ 174/92; 174/DIG. 8; 174/88 R
[58] Field of Search ............... 174/DIG. 8, 91, 92, 174/93, 88 R, 77 R

[56] References Cited

U.S. PATENT DOCUMENTS 4,203,000 5/1980 Muller ............................ 174/93 X Primary Examiner—Roy N. Envall, Jr.
Attorney, Agent, or Firm—Lyon & Lyon

[57] ABSTRACT

A cable sleeve outlet for splice cases comprising a substantially cylindrical member having at least one re-entrant portion and in its longitudinal wall shaped to provide a longitudinal channel, which channel has a longitudinal opening to the exterior of the outlet permitting the re-entrant portion to be wrapped around a cable or similar object aligned with the channel in use, and comprising a fastening means or support means insertable into the open end of the cylindrical member to bridge and thus hold closed the or each said longitudinal opening, the bridging part of the fastening means in use lying across the end cross-sections of the opposing longitudinal wall portions, and the fastening means being so formed that in use it bears on an inner surface of, and thus provides a substantially rigid internal support for, at least part of the longitudinal outside wall of the cylindrical member in addition to the part thereof involved in the said bridging closure.

The fastener is preferably in the form of two half-shells with slots which engage the re-entrant portions to hold the openings closed. Sealant material such as hot-melt adhesive is preferably provided on the cable-contacting surfaces of the re-entrant portions and on the fastening means. The cylindrical member may be closed at one end to effect a seal, especially for retaining pressure when used in pressurized splice cases.

17 Claims, 6 Drawing Figures

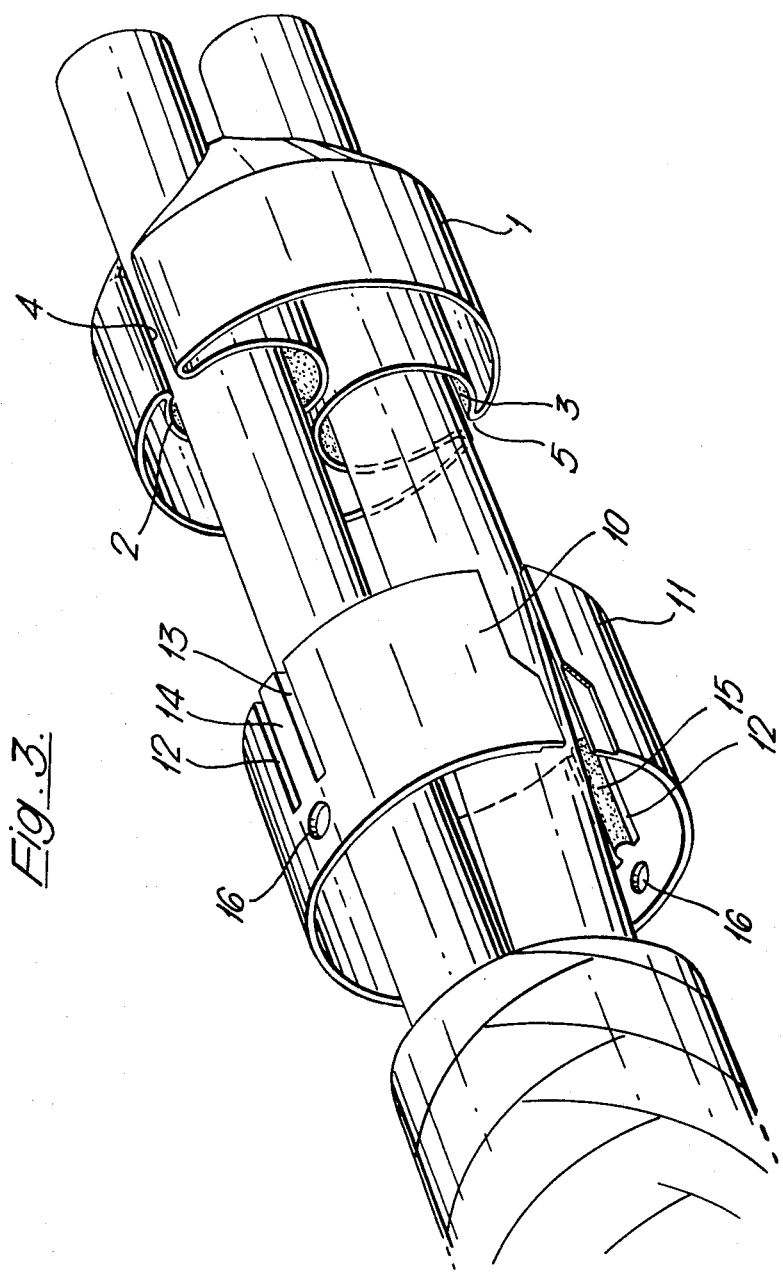

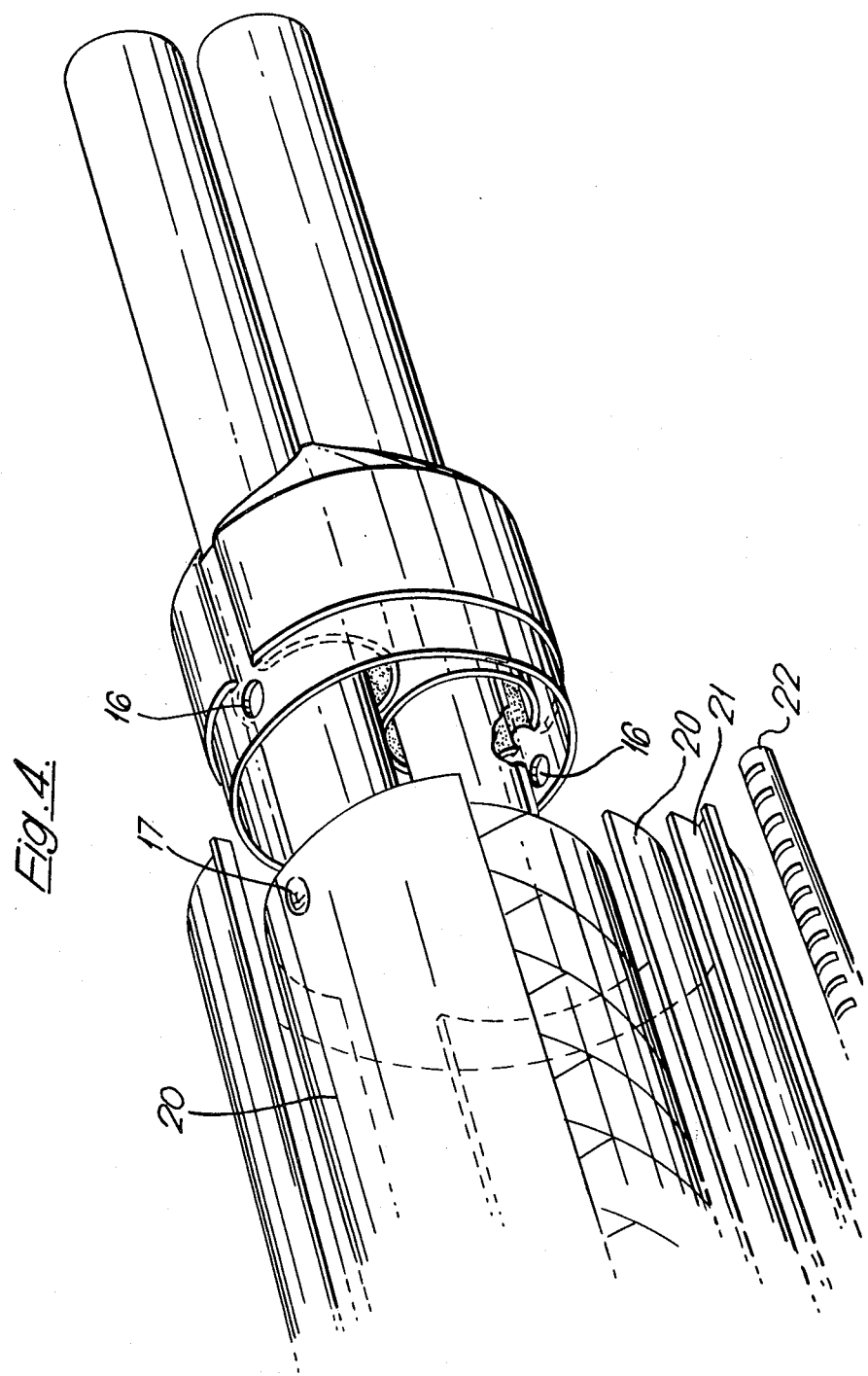

CABLE SLEEVE OUTLET FOR SPLICE CASE

This invention relates to a cable sleeve outlet for a splice case.

Cable sleeves are installed around a cable splice in order to protect and insulate the splice. It has been found advantageous to provide a splice case for such a cable with sleeve outlets of re-entrant "inside out" configuration to seal the sleeve around the cable, and this construction is particularly advantageous for telecommunications cables, which are often pressurised, the gas pressure within the splice case thus pressing the wall of the re-entrant outlet aperture into contact with the cable.

It is a limitation of known splice case systems that, although the case body may be of the "wraparound" type, the system cannot be applied to the installed cable without cutting the cable, owing to the use of moulded re-entrant outlet parts as aforesaid which must be slid on over the end of the cable. Outlet parts having longitudinal side slits entering the re-entrant hole or holes which conduct the cable(s) through the outlet have been used to enable the outlet to be "wrapped around" the cable(s) in the same way as the splice case body. However, known outlets of this kind, for example that described in our Belgian Pat. No. 857,630 tend to require undesirably complicated arrangements for fastening them around the cable and for supporting the outer wall of the outlet.

The present invention provides an elegantly simplified solution to this problem.

The invention accordingly provides a cable sleeve outlet comprising a substantially cylindrical member having at least one re-entrant portion in its longitudinal wall shaped to provide a longitudinal channel, which channel has a longitudinal opening to the exterior of the outlet permitting the re-entrant portion to be wrapped around a cable or similar object aligned with the channel in use, and comprising fastening means or support means insertable into the open end of the cylindrical member to bridge and thus hold closed the or each said longitudinal opening, the bridging part of the fastening means in use lying across the end cross-sections of the opposing longitudinal wall portions, and the fastening means being so formed that in use it bears on an inner surface of, and thus provides a substantially rigid internal support for, at least part of the longitudinal outside wall of the cylindrical member in addition to the part thereof involved in the said bridging closure.

The fastening means may be plate-like in form having at least one slot positioned so that, in use, the facing slot edges engage the interior of the opposing re-entrant portions at the or each said opening. Preferably, there is a pair of slots, these slots respectively engaging one each of the opposing re-entrant wall portions at the relevant opening, and it is particularly advantageous for the portion of the plate-like fastener between the pair of slots to carry material for sealing the closed opening. This central leg which separates the pair of slots is preferably a continuous integral part of the material forming the rest of the fastening means. Sealing material may also be carried by the re-entrant portions of the unit wall for sealing them on to a cable or other object around which they are wrapped in use, heat activatable adhesive (e.g. a hot melt adhesive) being preferred for this purpose and for the aforesaid sealing of the closed opening. For heat-activatable sealing materials it is preferable for the fastening means to have good heat conducting properties so as to facilitate the activation of the sealant. Metals are therefore preferred for forming the fastening means, e.g. die-cast aluminum, but heat conducting thermosetting polymers and other materials could also be useable.

Especially suitable hot-melt adhesives include, for example polyamides, ethylene/vinyl acetate copolymers and terpolymers (with or without incorporated waxes) and polyesters. Such materials are described, for example, in British Pat. No. 1,440,810 and German OS No. 2,709,717. Also suitable are curable adhesives which melt and flow on heating but which will not afterwards be hot-meltable. There may also be mentioned epoxy resins and conventional mastics such, for example, as those based on butyl and isobutylene rubbers modified with suitable materials known in the art. Obviously the use or otherwise of such materials and their type, if chosen, will depend upon the particular requirements in any given case.

It is usually desirable for the fastening means to bear on and internally support substantially the whole perimeter of the longitudinal wall which is presented on the outside of the cylindrical member in use, and for this it is convenient to use fasteners formed as part shells, usually two half shells, which can be fitted together around a cable passing through the outlet unit in use. Such shells are preferably shaped to fit together in such a way as to resist radial or longitudinal sliding or other undesirable displacement, and assymetric construction may be used so that only one mould is necessary to produce the complete set of part-shells. However, other supporting arrangements could be embodied in the fastening means if desirable. In preferred embodiments of this invention the fastening means includes a portion which, in use, projects beyond the open end of the cylindrical member, which projecting portion is adapted for attachment to splice case support members with which the present outlet is to be used.

Although the use of open-ended outlets is feasible in some circumstances, the cylindrical member of the outlet is usually closed at one end since it is usually desired for the outlet to seal the splice case against entry of moisture. Such sealing is of course essential to retain pressure when the outlet is used in pressurized splice cases. In such cases, the cylindrical member of the outlet is preferably anchored to resist longitudinal sliding under the "piston effect" of the internal pressure. Physical engagement of the cylindrical member with a suitably shaped projection or depression on the co-operating outlet or splice case members is a practical means of anchoring for this purpose.

Preferably at least the or each said re-entrant portion of the cylindrical member is made of heat recoverable polymeric material enabling it to be heat-shrunk on to the object around which it is wrapped in use. Heat-recoverable articles, especially heat-shrinkable articles, are now widely used in many areas where insulation, sealing and encapsulation are required. Usually these articles recover, on heating, towards an original shape from which they have previously been deformed, but the term "heat-recoverable", as used herein, also includes material which, on heating, adopts a new configuration, even if it has not been previously deformed.

The cylindrical member is preferably moulded from suitable polymeric material, for example, the polymeric materials exhibiting the property of elastic or plastic memory described, in U.S. Pat. Nos. 2,027,962;

3,086,242 and 3,957,372. As is made clear in, for example, U.S. Pat. No. 2,027,962, the original dimensionally heat-stable form of an extruded tube (for example) may be continuously expanded to a dimensionally heat-unstable form as part of a continuous extrusion process, but, in other applications, a preformed dimensionally heat-unstable form in a separate stage. In other articles, as described for example in British Pat. No. 1,440,524, an elastomeric member such as an outer tubular member is held in a stretched state by a second member, such as an inner tubular member, which, upon heating, weakens and thus allows the elastomeric member to recover.

Depending on the application concerned, the heat-recoverable material can be made from any of the polymers known from the art to be useful for the production of heat-recoverable articles. Generally, the sheet material will be of constant composition throughout; however laminates of two different polymers bonded or fused together may be used in certain instances. Amongst suitable polymers there may be mentioned, for example, polyolefins, especially polyethylene, copolymers of ethylene and vinyl acetate, copolymers of ethylene and ethyl acrylate; chlorinated and fluorinated polymers, especially polyvinyl chloride, polyvinylidene fluoride and polymers incorporating units from vinylidene fluoride, hexafluoroethylene and chlorotrifluoroethylene; and rubbers such as ethylene/propylene rubber, chlorinated rubbers, e.g. Neoprene, and silicone rubbers which may be used in a blend with a crystalline or glassy polymer such as an olefin polymer. All of the above materials may, if desired, be cross-linked for example by irradiation and/or chemical means.

Embodiments of the present invention will now be described, with reference to the accompanying drawings, wherein:

FIG. 3 shows a perspective view of a two-channel cylindrical member together with a preferred form of fastening means positioned around a cable; and FIG. 4 shows the outlet of FIG. 3 in its installed position together with splice cover and half-shell splice cover supports as used in practice.

Figure 1A:
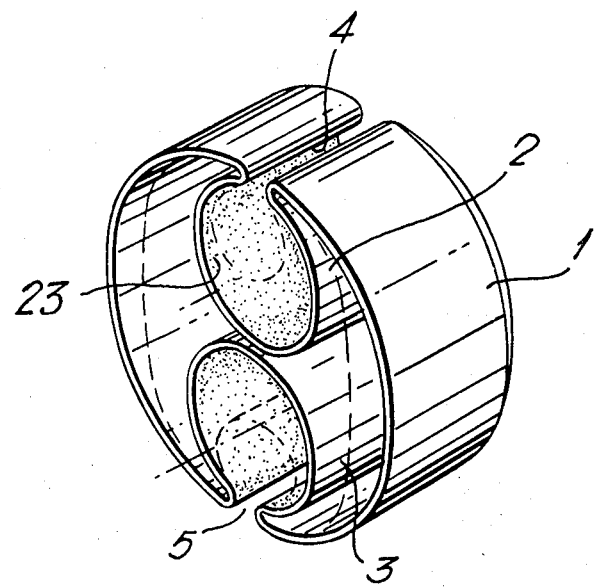
FIGS. 1a and 1b show in perspective views of the open and closed ends respectively of a cylindrical member with two cable channels for use in the present invention.
Figure 1B:
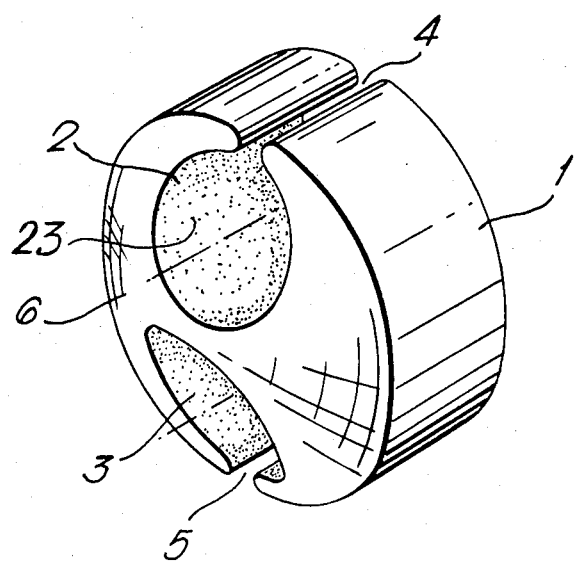
Figure 2A:
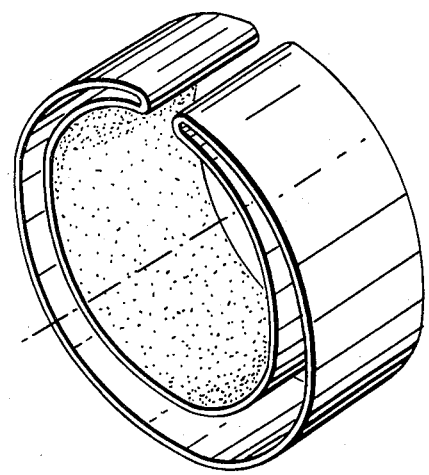
FIG. 2a shows a single-channel version of the cylindrical member from the open end.
Figure 2B:
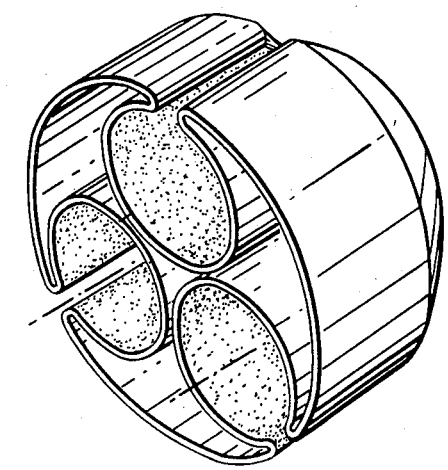
FIG. 2b shows a similar view of a three-channel cylindrical member.

Referring to FIGS. 1a and 1b, the cylindrical member, which in this case is entirely composed of heat shrinkable polymer, comprises an outer wall 1 in which re-entrant portions 2 and 3 are formed, each re-entrant portion constituting a cable-receiving channel and having a longitudinal opening 4, 5 to the exterior. One end 6 of this cylindrical member is closed for containment of pressure. The re-entrant portions are coated with hot melt adhesive (indicated at 23) on the surface which in use makes contact with the cable surface. A heat-recovered shape of this cylindrical member is indicated by the broken lines in FIG. 1a. FIGS. 2a and 2b can readily be understood by analogy with FIGS. 1a and 1b.

In use, the cylindrical member having an appropriate number of channels for the number of cables or similar objects being accommodated is placed around the cables in the manner shown in FIG. 3 and suitable fastening means are slid into the open end of the cylindrical member 1 to close openings 4, 5, and to support the exposed outer wall 1 of the cylindrical member. As shown in FIG. 3, a preferred form of fastening means consists of a pair of half shells 10, 11 having a pair of parallel slots 12, 13 for each opening 4, 5. The slots of a given pair respectively slide on to the opposed re-entrant wall portions of the cylindrical member, defining the openings 4, 5, which openings are thus closed by the central leg or tongue 14, and are held closed by the bridging slot edges engaging the interior surface of the opposed re-entrant portions. This preferred embodiment also shows the aforementioned sealing material 15 which is carried by the central leg or tongue and serves to seal the closure. This sealing material may be the same as that coated on the cable-contacting surface of the re-entrant portion.

When the fastening means has been properly positioned within the cylindrical member to hold closed the openings 4, 5, the cylindrical member may be heat shrunk on to the fastening means and on to the cables, the heat applied for this shrinking causing the sealing material to melt and seal the outlet unit to the cables. FIG. 4 shows this completed stage.

FIG. 4 also shows how the body portion of the wrap-around splice case may be applied to cover the splice in the cable and may be attached to the fastener/support of the outlet by means of a screw holes 16 in the latter and 17 in the body support half shells 20. The wrap-around heat shrinkable case body sleeve 21 and securing channel therefor 22 are also shown in FIG. 4 and are applied in a known manner to cover the splice, the sleeve 21 preferably overlapping the outlet to as great an extent as possible, desirably over the whole of the circular portion of the outlet, so as to provide the longest possible potential leakage path from the joint of the body half shells with the outlet half shells to the outside environment.

I claim:
1. A cable sleeve outlet comprising:
    a substantially cylindrical member having at least one re-entrant portion in its longitudinal wall shaped to provide a longitudinal channel communicating with the exterior surface of said longitudinal wall a longitudinal opening to the exterior of said cylindrical member to form a longitudinal opening therein permitting each said re-entrant portion to be wrapped around an elongate object; and,
    support means insertable into an end of said cylindrical member, said support means being so formed that in use it bears against the inner surface of said longitudinal well to provide a substantially rigid internal support for at least part of said longitudinal wall of said cylindrical member, said support means including a bridging portion corresponding to each said longitudinal opening and in use lying across each said longitudinal opening to bridge and hold closed each said longitudinal opening.

2. An outlet according to claim 1 wherein said support means is plate-like in form and has at least one slot positioned so that the facing slot edges engage the inner surface of the opposing walls bordering each said longitudinal opening in each said re-entrant portion of said cylindrical member.

3. An outlet according to claim 2, wherein said support means includes at least one pair of slots which slots respectively engage one each of said opposing walls.

4. An outlet according to claim 3, wherein the material of said support means which separates the said pair of slots carries material for sealing the closed opening.

5. An outlet according to claim 3 or 4, wherein the material comprising of the support means which separates the said pair of slots is a continuous integral part of the material forming the rest of said support means.

6. An outlet according to claim 1, wherein each said re-entrant portion carries material for sealing to the elongate object around which it is wrapped in use.

7. An outlet according to claim 4 or 6, wherein said material for sealing is a heat activatable adhesive.

8. An outlet according to any one of claims 1 to 3, wherein said support means is so formed that it bears on and internally supports substantially the whole perimeter of said longitudinal wall which is presented to the outside of said cylindrical member in use.

9. An outlet according to claim 1, wherein said support means comprises part shells capable of being together to surround a cable passing through the outlet unit in use.

10. An outlet according to any one of claims 1 to 3, wherein said support means includes a portion which in use projects beyond the end of said cylindrical member which projecting portion is adapted for attachment to support members of a splice case with which the outlet is to be used.

11. An outlet according to claim 1, wherein the whole of said cylinrical member is made of heat recoverable polymeric material.

12. An outlet according to any one of claims 1 to 3, wherein said cylindrical member is a moulded article.

13. An outlet according to any one of claims 1 to 3, wherein said cylindrical member is closed at one end so as to be capable of retaining internal pressure when used in a pressurized splice case.

14. A cable splice case incorporating a cable sleeve outlet according to any one of claims 1 to 3, and 11.

15. A splice case according to claim 14, wherein the cylindrical member of the outlet is physically engaged with a projection or depression carried by a co-operating member so as to resist longitudinal sliding of the cylindrical member.

16. A cable sleeve outlet comprising:
a substantially cylindrical member having at least one heat-shrinkable re-entrant portion in its longitudinal wall shaped to provide a longitudinal channel communicating with the exterior surface of said longitudinal wall to form a longitudinal opening therein permitting each said re-entrant portion to be wrapped around and heat-shrunk onto an elongate object; and,
support means insertable into an end of said cylindrical member said support means being so formed that in use it bears against the inner surface of said longitudinal wall to provide a substantially rigid internal support for at least part of said longitudinal wall of said cylindrical member, said support means including a bridging portion corresponding to each said longitudinal opening and in use lying across each said longitudinal opening to bridge and hold closed said longitudinal opening.

17. An outlet according to any one of claims 1 to 3, 11 and 16 wherein said cylindrical member has more than one said re-entrant portion, said support means bridging and holding closed each resulting longitudinal opening.

* * * * *

UNITED STATES PATENT AND TRADEMARK OFFICE
CERTIFICATE OF CORRECTION

PATENT NO. : 4,350,842
DATED : September 21, 1982
INVENTOR(S) : JEAN NOLF

It is certified that error appears in the above—identified patent and that said Letters Patent is hereby corrected as shown below:

Claim 1 of the above-entitled patent should read:

1. A cable sleeve outlet comprising:
a substantially cylindrical member having at least one re-entrant portion in its longitudinal wall shaped to provide a longitudinal channel communicating with the exterior surface of said longitudinal wall of said cylindrical member to form a longitudinal opening therein permitting each said re-entrant portion to be wrapped around an elongate object; and
support means insertable into an end of said cylindrical member, said support means being so formed that in use it bears against the inner surface of said longitudinal wall to provide a substantially rigid internal support for at least part of said longitudinal wall to said cylindrical member, said support means including a bridging portion corresponding to each said longitudinal opening and in use lying across each said longitudinal opening to bridge and hold closed each said longitudinal opening.

Signed and Sealed this

Thirty-first Day of May 1983

[SEAL]

Attest:

DONALD J. QUIGG

Attesting Officer  Acting Commissioner of Patents and Trademarks